UNITED STATES PATENT OFFICE.

JOHN A. ROBINSON, OF BERWIND, COLORADO.

BOILER-CLEANING COMPOUND.

SPECIFICATION forming part of Letters Patent No. 701,508, dated June 3, 1902.

Application filed April 10, 1902. Serial No. 102,243. (No specimens.)

*To all whom it may concern:*

Be it known that I, JOHN A. ROBINSON, a citizen of the United States, residing at Berwind, in the county of Los Animos and State of Colorado, have invented certain new and useful Improvements in Boiler-Cleaning Compounds, of which the following is a specification.

My invention relates to an improved cleaning compound particularly adapted for cleaning the scales, rust, or foreign matter from the tubes, flues, pipes, or valves of boilers, although it may be used for other purposes where it would effect the desired object.

The compound or composition consists of the dung or droppings of cattle or other animals which chew the cud, combined with water from boiled potatoes, ammonia or hartshorn, sal-soda, coal-oil, black oil, wood-ashes, and sulfur thoroughly mixed to provide a cheap and efficient cleaning medium for the purpose stated.

To make fifty gallons of the composition, I use the following ingredients in the proportions stated, to wit: sixteen gallons of dung and forty-five gallons of water, and to the water obtained from ten pounds of potatoes add two ounces of ammonia, one-half pound of sal-soda, one-half gallon of coal-oil, one-half gallon of black oil, one-half gallon of wood-ashes, and two ounces of sulfur, and the liquid thus obtained is brought into contact with the portions of the boiler which require cleaning, and the liquid will entirely remove the rust or scales and in addition the action of the oil with the other ingredients will serve as a lubricant and will act to prevent a future appearance of the rust or scales.

I have found by experience that my composition effects the cleaning in a perfect manner and prevents the accumulation of rust or scales after being used and also that about one quart of the liquid to each horse-power of the boiler is a sufficient quantity to secure the best results—that is, ten gallons would be ample to clean the pipes, flues, or valves of a forty-horse-power boiler.

It will be understood that my cleaning composition is easy to use and is composed of ingredients which enable the composition to be quickly and readily made at a very small cost.

I claim—

The cleaning compound or composition herein described, composed of the water from boiled potatoes, ammonia, sal-soda, coal-oil, black oil, wood-ashes and sulfur, combined with the dung or droppings from animals which chew the cud, in the manner and proportions stated.

In testimony whereof I affix my signature in presence of two witnesses.

JOHN A. ROBINSON.

Witnesses:
    ANORTACIO GARCIA,
    AL. WOOD.